United States Patent

Tominaga et al.

Patent Number: 5,119,123
Date of Patent: Jun. 2, 1992

[54] CAMERA HAVING A REMOTE CONTROL FUNCTION

[75] Inventors: Shinji Tominaga; Masaaki Nakai; Sadafusa Tsuji, all of Osaka; Koh Hayama, Kumamoto; Hiroyuki Okada, Osaka, all of Japan

[73] Assignee: Minolta Camera Kabushiki Kaisha, Osaka, Japan

[21] Appl. No.: 494,231

[22] Filed: Mar. 15, 1990

[30] Foreign Application Priority Data

| Mar. 16, 1989 | [JP] | Japan | 1-64843 |
| Mar. 22, 1989 | [JP] | Japan | 1-69792 |
| Mar. 24, 1989 | [JP] | Japan | 1-73137 |
| Mar. 24, 1989 | [JP] | Japan | 1-73138 |

[51] Int. Cl.⁵ ............................................. G03B 3/00
[52] U.S. Cl. ................................ 354/402; 354/131
[58] Field of Search ............... 354/137, 267.1, 223.1, 354/402, 131

[56] References Cited

U.S. PATENT DOCUMENTS

| 4,289,388 | 9/1981 | Wakabayashi et al. | 354/402 |
| 4,472,045 | 9/1984 | Alyfuku et al. | 354/267.1 |
| 4,582,413 | 4/1986 | Suzuki et al. | 354/267.1 |
| 4,651,216 | 3/1987 | Arai et al. | 354/442 |
| 4,864,340 | 9/1989 | Kaneko | 354/266 |

FOREIGN PATENT DOCUMENTS

| 56-12631 | 2/1981 | Japan . |
| 56-18930 | 2/1981 | Japan . |
| 56-29222 | 3/1981 | Japan . |
| 57-96439 | 6/1982 | Japan . |
| 57-135938 | 8/1982 | Japan . |
| 57-150836 | 9/1982 | Japan . |
| 58-111025 | 7/1983 | Japan . |
| 60-46538 | 4/1985 | Japan . |
| 63-118729 | 5/1988 | Japan . |

Primary Examiner—Russell E. Adams
Assistant Examiner—Jae Noh
Attorney, Agent, or Firm—Willian Brinks Olds Hofer Gilson & Lione

[57] ABSTRACT

A camera having a remote controller. The automatic focusing mechanism of the camera measures a distance from the camera to a main object positioned within approximately the center region of a focus area and automatically obtains a in-focus condition in correspondence with the measured object distance. The camera includes a memory for storing a maximum object distance at which in-focus conditions are obtained by the automatic focusing mechanism in a remote control photographing mode. When the main object is photographed in the remote control photographing mode, a comparing device compares an object distance measured by the automatic focusing mechanism and the maximum object distance set in the memory with each other. If the measured object distance is less than the maximum object distance, an optical system is adjusted to a normal photographing mode. If the main object is positioned outside the focus area and the object distance measured by the automatic focusing mechanism is longer than the maximum object distance, the measured data is altered to the maximum object distance. According to a modified camera having the automatic focusing mechanism and an automatic exposure mechanism, in a photographing under the same light condition, an aperture size in the remote control mode is set to be larger than an aperture size set by the automatic exposure mechanism in the normal photographing mode.

13 Claims, 7 Drawing Sheets

CAMERA HAVING A REMOTE CONTROL FUNCTION

BACKGROUND OF THE INVENTION

1. Field of the Invention

The present invention relates to a camera having a remote controller and, more particularly, to a camera having an automatic focusing mechanism and capable of photographing a main object in a substantially focused condition even if it is misaligned with a focus area in performing a shutter release operation by the remote controller.

2. Description of the Related Art

A camera having an automatic focusing mechanism capable of performing a shutter release operation by a remote controller has been developed.

An automatic focusing mechanism measures a distance between a camera and an object positioned within the focus area to obtain a in-focus condition of the object. The focus area is arranged approximately in the center region of a field of view of the viewfinder. Accordingly, in performing a shutter release operation by a remote controller so as to have the picture of his/her figure taken, the photographer decides previously a position in the field of view of the viewfinder in which he/she should be situated so as to align himself/herself with the focus area by viewing the viewfinder. He/She must then move to the position which he/she has decided so as to have him/her taken in a focused condition. In taking a photograph of an object other than the photographer by remote control operation, it is necessary for him/her to judge whether an object to be focused is positioned in the focus area. Therefore, it is difficult to take a photograph of the object in focus. If a main object to be focused is positioned outside the focus area, the automatic focusing mechanism performs a distance measuring operation for bringing an object other than the main object into focus. Therefore, in taking a photograph of a composition as shown in FIG. 10 in particular, the automatic focusing mechanism measures an infinite object distance. Thus, a photograph is taken without bringing a person as the main object into focus.

SUMMARY OF THE INVENTION

It is an object of the present invention to provide a camera, having a remote controller, capable of photographing a main object by bringing the main object into a substantially focused condition using the remote controller even under a condition that the main object is positioned outside a focus area in a field of view of the viewfinder.

It is another object of the present invention to provide a camera, having a remote controller, capable of photographing a main object by bringing the main object into a substantially focused condition using the remote controller by forcibly altering an object distance value measured by the automatic focusing mechanism into a predetermined value even under the above-described condition of the alignment.

It is still another object of the present invention to provide a remote controllable camera capable of photographing, even under the above described condition of the alignment, by bringing the main object into a substantially focused condition by a forcible stop down of the aperture diaphragm which has been adjusted by automatic exposure control mechanism.

A camera having a remote controller according to an embodiment of the present invention comprises:

automatic focusing means for performing a focusing operation on an object aligned with a focus area which is positioned within a predetermined region of a field of view of a viewfinder;

memory means for storing a predetermined maximum object distance at which in-focus conditions are obtained by the automatic focusing means in a remote control photographing mode;

means for comparing the object distance measured by the automatic focusing means and the maximum distance with each other; and means for replacing the measured object distance by the maximum distance when the measured distance exceeds the maximum object distance.

According to the above-described camera of the present invention, a maximum object distance which can be focused by the automatic focusing means is set in consideration of the fact that normally, a figure is photographed with a limited range spaced from the camera. In taking a photograph in a remote control photographing mode, a photographer cannot check an image of the viewfinder whether or not the main object is positioned outside a focus area. In such a case, the distance measured by an automatic focusing means is equal to the distance from the camera to the background. If the measured distance exceeds the maximum object distance, the photographing optical system of the camera is set to a predetermined adjusted condition in carrying out a camera exposure so that the main object is focused or substantially focused assuming that the main object is positioned in the vicinity of the maximum object distance irrespective of values measured by the automatic focusing means.

When a photographer takes his/her figure picture using a camera of the embodiment, first, he/she fixes the camera to a tripod, then, he/she checks his/her position by watching an image in the viewfinder, thus deciding a composition. Thereafter, the photographer moves to his/her decided position, thus performing a shutter release operation at the position by the remote controller.

In this case, if the position he/she intends to situate himself/herself is within the focus area and he/she moves to the position, the distance between him/her and the camera body is measured by the measuring device of the automatic focusing means and a focusing operation is carried out by the driving device of the automatic focusing means according to the measured distance. Thus, when he/she is situated in the appropriate position, he/she can be photographed in focus.

The distance between the camera and the photographer is not measured, but the distance between the camera and the background is measured in the following cases. If the position he/she has decided to move is outside the focus area and he/she moves to the position, if a position he/she has decided to situate himself/herself is within the focus area and yet he/she moves outside the focus area or if the measured distance exceeds the predetermined focusable maximum distance, the object distance is altered into the focusable maximum distance in priority to the measured distance. In other words, the position to be focused by the automatic focusing mechanism is altered to the focusable maximum object distance. This signifies that the main object is photographed by bringing into focus the position corresponding to the focusable maximum object distance almost equal to the distance between the camera and the photographer. That is, a defocus amount on the main object is reduced. On the other hand, according to a focusing operation performed by a normal automatic focusing mechanism, the background is brought into focus while the main object is out of focus. It is preferable to set the maximum object distance either to a value corresponding to an object distance normally selected by a photographer when he/she takes his/her photograph in the remote control photographing mode or to approximately an average value of object distances practically adopted in the remote control photographing mode. A maximum object distance may be determined in consideration of distances which signals such as a light, a sound wave or an electric wave outputted from the remote controller can reach the camera supposing that the photographer is photographed as the main object.

According to an embodiment of the present invention, the following construction is provided so that a main object misaligned with a focus area can be photographed in focus by the remote controller.

That is, the camera having the remote controller according to the embodiment comprises:

automatic focusing means for performing a focusing operation on an object positioned within approximately the center region of a field of view of a viewfinder; and means for selectively setting one of a first and a second aperture size under a predetermined amount of light, the first aperture size being used in a normal photographing mode and, the second aperture size, which is smaller than the first aperture size, being used in a remote control photographing mode.

The procedure in photographing his/her picture as a main object by a remote controller is the same as the above-described embodiment.

If the position he/she intends to situate himself/herself is within the focus area and he/she moves to the position, the distance between him/her and the camera body is measured by the measuring device of the automatic focusing means and a focusing operation is carried out by the driving device of the automatic focusing means according to the measured distance. Thus, when he/she is situated in the appropriate position, he/she can be photographed in focus.

On the other hand, if the position he/she has decided to situate himself/herself is outside the focus area and he/she moves to the position or if the position he/she has decided to situate himself/herself is within the focus area and yet he/she moves outside the focus area, the distance between the camera and the photographer is not measured, but the distance between the camera and the background is measured. Then, a focusing operation is performed according to the distance between the camera and the background. Then, a shutter release operation is carried out.

When a photographing is performed in the remote control mode, the aperture size is set smaller than an aperture size which should be set in the normal photographing mode under the same light condition as that in the remote control mode. Accordingly, the depth of field in the remote control photographing mode is greater than in the normal photographing mode. When an object is photographed with the aperture diaphragm stopped down to such a smaller size for a given shutter speed, the camera exposure has to take place for a long time. But under the remote control photographing mode, the camera is usually fixed to the tripod. Therefore, such photographing can be usually performed without occurrence of a camera movement. Thus, even though the main object is out depth of field in normal photographing mode, it can be photographed in focus condition in the remote control photographing mode. This is because the object is in the depth of field in the remote control photographing mode. Even though the object is out of focus because it is not positioned within the above-described depth of field, the defocus amount thereof can be reduced in comparison with the normal photographing mode.

According to a still another embodiment, the remote controller is removably mounted on the camera body, so as to cover at least one operation member for a remote control photographing mode provided on the camera body.

According to the camera having the remote controller, it may occur in the normal photographing mode that a photographer operates an operation member provided on the remote controller mounted on the camera body by mistake. For example, in case of a camera having a release delay mode which can be selected in the remote control photographing mode and having a release delay mode setting switch as one of the operation members, if the photographer turns on the release delay mode setting switch by mistake, a shutter release timing will be delayed. But according to the camera of the present invention, the operation members for the remote control operation are covered with the remote controller in the normal photographing mode. Under the remote control photographing mode, the photographer can operate the operation members as he/she desires because they are exposed to the outside. Therefore, the construction of the camera according to this embodiment prevents, for example, a shutter release delay due to a photographer's mis-operation of the release delay mode setting switch. In addition, in the remote control photographing mode, the operation members are uncovered. Accordingly, the photographer does not forget operating the operation members and as such, a mistake does not occur in taking a photograph.

As apparent from the above, if the camera has an object distance fixing switch as a second operation member, for fixing a predetermined object distance so as to obtain a in-focus condition of a main object in the remote control photographing mode, since the object distance fixing switch does not turn on in the normal photographing mode, it does not occur in the normal mode that a main object is photographed when it is out of focus.

Further, if the camera has a switch as a third operation member, for switching the photographing mode from the normal photographing mode to the remote control photographing mode, since the switch is not operated in the normal photographing mode, it does not occur that an object is not photographed under the remote control photographing mode.

According to a further embodiment, the following construction is provided.

That is, a camera having a remote controller comprises:

delay time setting means for setting a time for delaying an exposure timing after a shutter release operation is performed in a remote control photographing mode; and sound generating means, provided in a remote controller, for indicating an exposure timing according to the delay time set by the delay time setting means.

For example, according to the camera having the remote controller, when a photographer performs a shutter release operation so as to take his/her photograph by operating the remote controller, a delay time can be set so that a camera exposure is performed a predetermined period of time after a release switch is operated. During the delay time, he/she can hide the remote controller so as not to be photographed. When the photographer takes a photograph under the delay release mode using the remote controller, it is impossible for the photographer to know when a camera exposure is carried out after a shutter release operation is made. Thus, it may happen that he/she cannot take a photograph as he/she desired because the shutter is released earlier than he/she expected.

However, according to the camera having the above construction, a sound generated by the sound generating means in correspondence with the delay time he/she has set informs him/her of an camera exposure timing. Owing to an indication by a sound, even though the remote controller is hidden in a place where the photographer cannot see, he/she is informed of the exposure timing he/she has set.

According to a still further embodiment, a camera having a remote controller comprises:

delay time setting means for setting a time for delaying an exposure timing after a shutter release operation is performed in a remote control photographing mode; and light emitting means, provided on the front surface of a camera body, for indicating an exposure timing according to the delay time set by the delay time setting means.

According to this embodiment, instead of the sound generating means which informs a photographer of a camera exposure timing according to the above-described embodiment, a light emitting means is provided on the front surface of the camera body. The camera is provided which has a light emitting means which flashes to indicate a camera exposure timing in a self-timer photographing mode. In such a camera, it is preferable to use the light emitting means for both the self-timer mode and the release delay mode. This construction prevents the above-described photographing mistake without providing a new indication means on the camera body.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

An embodiment of the present invention is described below.

Figure 1:
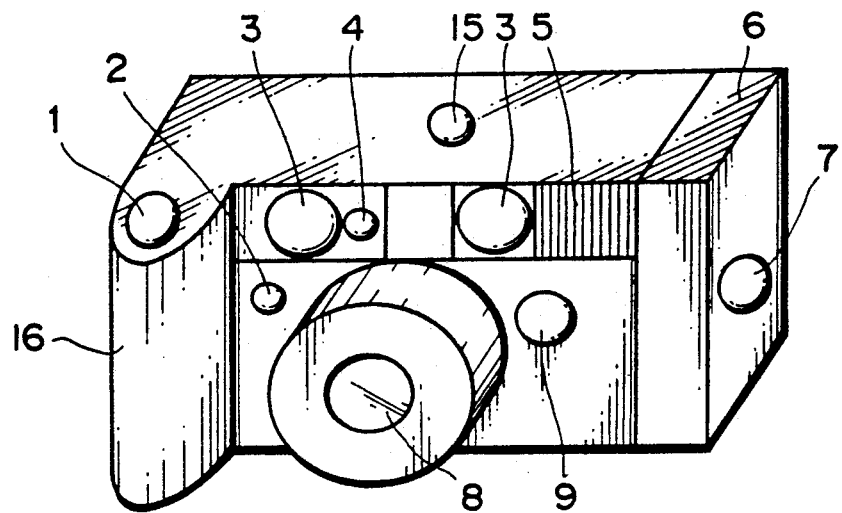
FIG. 1 is a schematic perspective view showing a camera, having a remote controller according to an embodiment of the present invention, in which the remote controller is mounted on the camera body.

Referring now to FIG. 1, a photometric operation is started upon a first stage of depression of a release button 1 disposed on the upper surface of the gripping section 16 of the camera body, and a shutter release operation is effected upon the subsequent second stage of depression thereof. A self-timer display section 2 disposed in the upper left of a photographing lens (hereinafter referred to as lens) displays by means of a flash that a photographing is being made in a self-timer mode. A light projecting-receiving section 3 for measurement of an object distance, a sensor 4 for performing a photometric operation, and an electronic flashlight emitting section 5 are disposed on the upper portion of the front surface of the camera body. A remote controller 6, the height and thickness of which are the same as those of the camera body is removably mounted on the edge face thereof opposite to the gripping section 16. A release button 7 for a remote control photographing is disposed on the outer edge surface of the remote controller 6. In the remote control photographing mode (hereinafter referred to as remote control mode), the pressing of the release button 7 allows the remote controller 6 to produce a release signal which is to be received by a signal receiving section 9 disposed on the front surface of the camera body. A switching button 15 positioned on the upper surface of the camera body is used to select the self-timer photographing mode (hereinafter referred to as self-timer mode) or the normal photographing mode (hereinafter referred to as normal mode).

Figure 2:
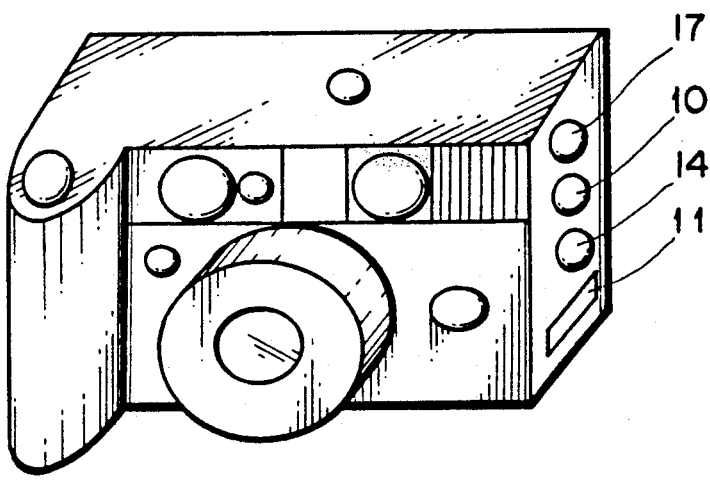
FIG. 2 is a schematic perspective view showing the camera body shown in FIG. 1.

As shown in FIG. 2, there are provided, on the surface for mounting the remote controller 6, an object distance fixing switch 10, a remote controller detecting switch 14 serving as a means for switching the normal mode to the remote control mode, a release delay mode setting switch 17, and a connector 11 for electrically connecting the remote controller 6 to the camera body. Describing the operations of the above switches 10, 14, and 17, in the remote control mode, when the object distance fixing switch 10 is pressed, the measured object distance is stored in the memory of a microcomputer. The remote controller detecting switch 14 detects whether or not the remote controller 6 is mounted on the camera body. The release delay setting switch 17 is operated to move the ON position or the OFF position and remains at either the ON position or the OFF position. When the release delay setting switch 17 is at the ON position under the remote control mode, the release delay mode is set so that a camera exposure is performed a predetermined period of time after the release button 7 of the remote controller 6 is pressed.

Figure 3:
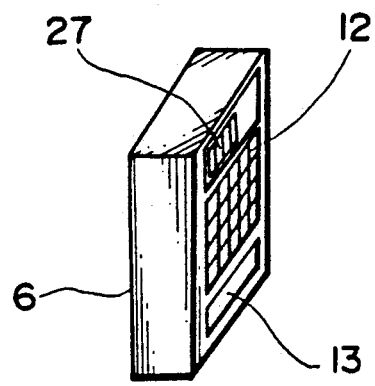
FIG. 3 is a schematic perspective view showing the remote controller of FIG. 1 as viewed from the back side thereof.

As shown in FIG. 3, the remote controller 6 is mounted on the camera body with the back surface thereof contacting the camera body. A connector 13 of the remote controller 6 is connected to the connector 11 of the camera body. When the remote controller 6 is removed from the camera body, the power source installed in the remote controller 6 is charged by a solar battery 12 mounted on the back surface of the remote controller 6. A sound generation setting member 27 is operated to move to the ON or OFF positions. The selected ON or OFF position remains at either the ON position or the OFF position. When the release delay mode is set by the release delay setting switch 17 with the sound generation setting member 27 moved to the ON position, it generates a sound to indicate that time is counted until a camera exposure will be carried out.

The electrical construction of the control system of the embodiment of the camera in accordance with the present invention is described with reference to a circuit diagram shown in FIG. 4. Reference symbol MC shown in FIG. 4 denotes a microcomputer.

The microcomputer has switches, a switch S1 adapted for performing a photometric operation (hereinafter referred to as photometric switch S1), a release switch S2, a self-timer photographing switch Sslf, an automatic focusing lock switch Safl (hereinafter referred to as AF lock switch Safl), a delay switch Sdel, and a remote control switch Srem. Upon the first stage of depression of the release button 1 shown in FIG. 1, the photometric switch S1 is turned on. Likewise, upon the subsequent second stage of depression of the release button 1, the release switch S2 is turned on. Upon the pressing of the switching button 15 for selecting the self-timer mode shown in FIG. 1, the self-timer photographing switch Sslf is turned on and it is turned off upon the release of the switching button 15. Similarly, upon the pressing of the object distance fixing switch 10 shown in FIG. 2, the AF lock switch Safl is turned on, and upon the release thereof, the AF lock switch Safl is turned off. When the release delay mode setting switch 17 is moved to the ON position, the delay switch Sdel is turned on. Upon the moving of the delay setting switch 17 to the OFF position, the delay switch Sdel is turned off. The remote control switch Srem is turned on when the remote controller detecting switch 14 detects that the remote controller 6 has been mounted on the camera body, and the remote control switch Srem is turned off when the remote controller 6 is removed therefrom. The microcomputer MC controls the operation of the camera according to the ON and OFF of the switches.

Figure 4:
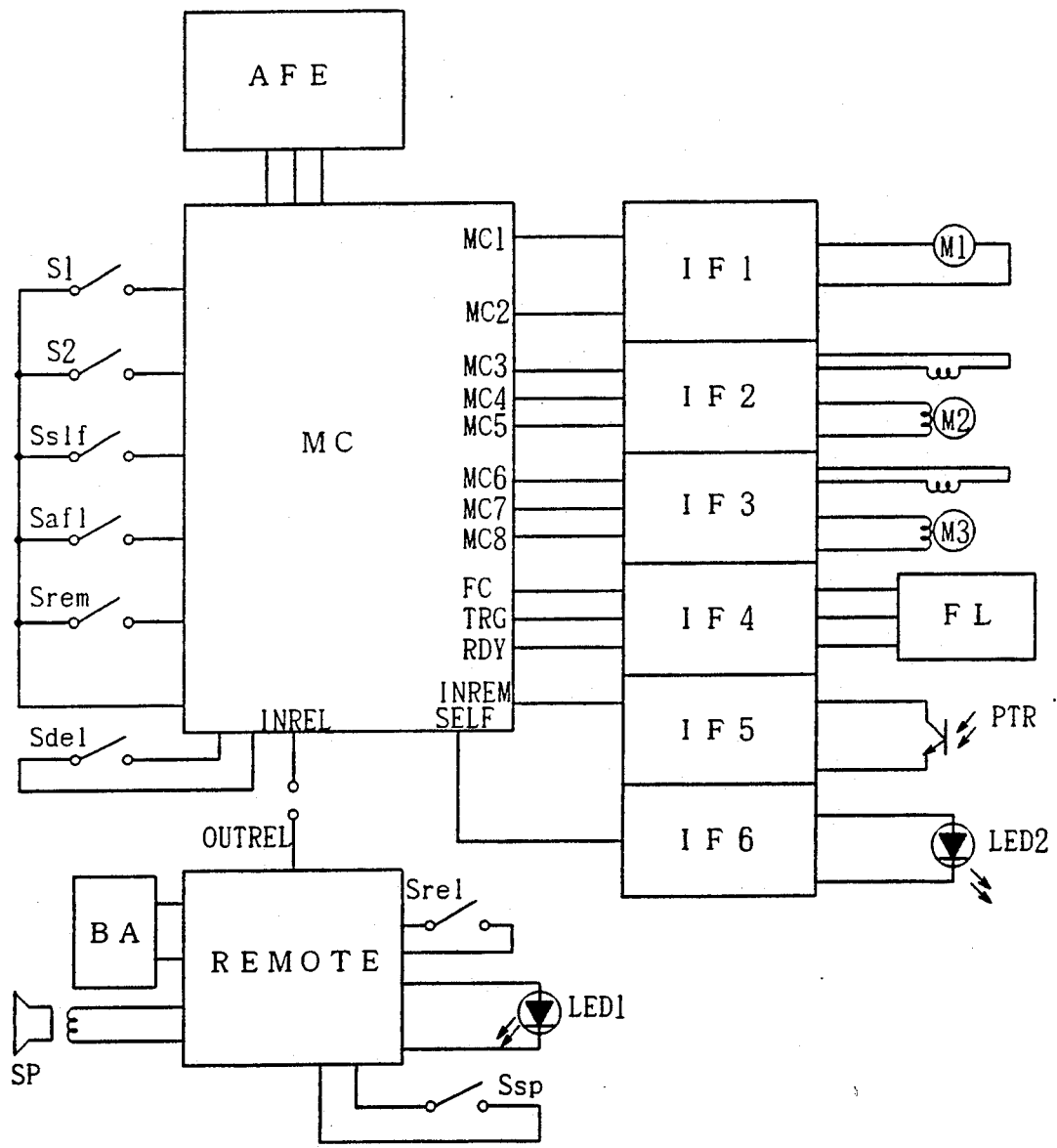
FIG. 4 is a circuit block diagram of the camera of FIG. 1.
Figure 5:
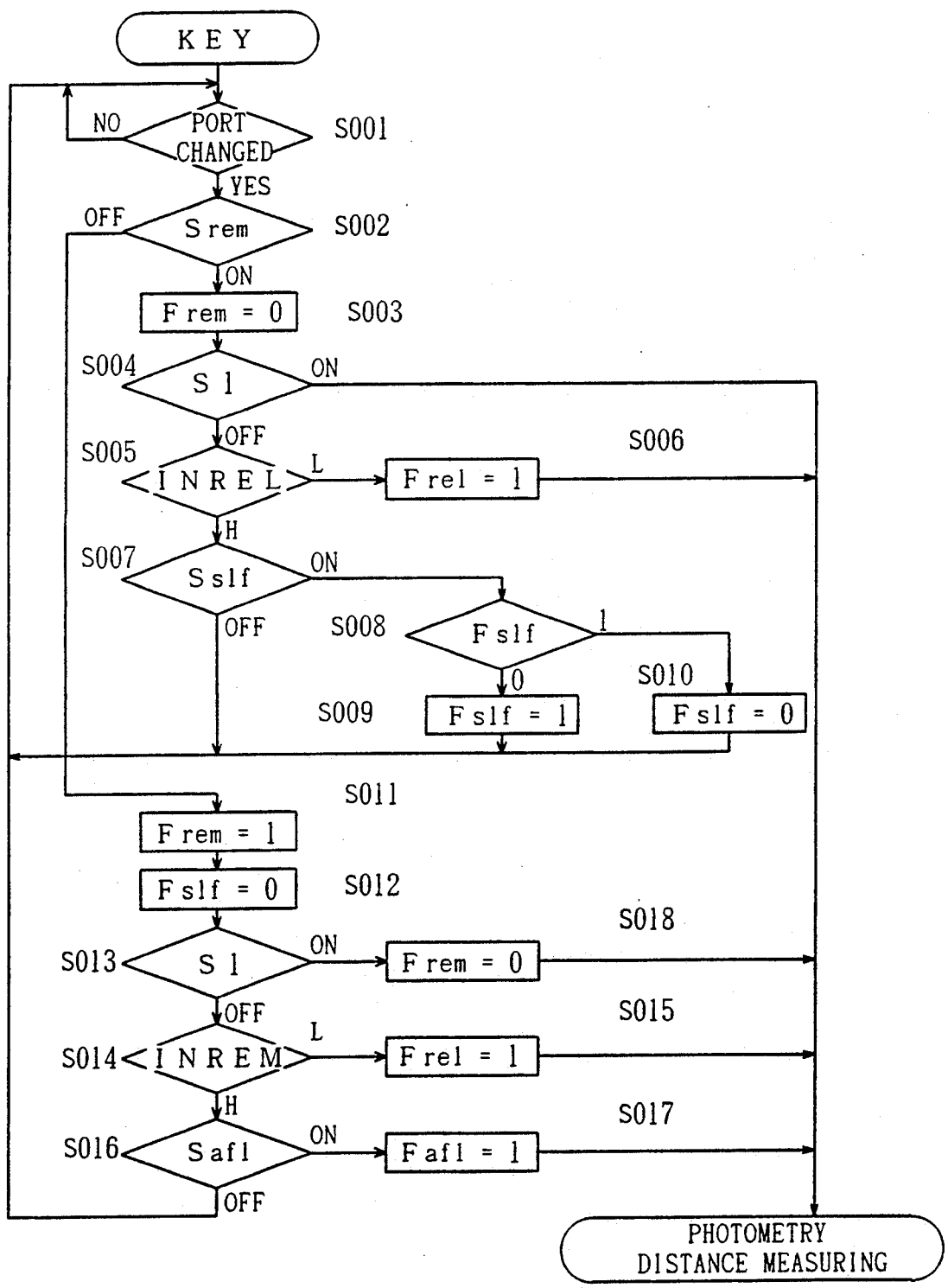
FIGS. 5 through 8 are flowcharts of the circuits of FIG. 4.

Referring also to FIG. 4, an integrated circuit (IC) of an automatic focusing and exposure (AFE) illustrated above the microcomputer MC performs photometric and distance measuring operations according to the instruction of the microcomputer MC and sends data back to the microcomputer MC.

Interfaces IF1 through IF6 are illustrated on the right side of the microcomputer MC. The interface IF1 is illustrated between the microcomputer MC and a film winding motor M1 and connected with the microcomputer MC through terminals MC1 and MC2. The condition of the combination of high and low signal levels at the terminals MC1 and MC2 controls the operation of the motor M1, namely, normal and reverse rotations, idling, braking.

The interface IF2 is illustrated between the microcomputer MC and a stepping motor M2 for moving the lens and connected with the microcomputer MC through terminals MC3, MC4, and MC5. The stepping motor M2 is energized or deenergized according to the signal level at the terminal MC3. The rotational direction thereof is controlled by the signal levels at the terminals MC4 and MC5.

The interface IF3 is illustrated between the microcomputer MC and a stepping motor M3 for driving the shutter and connected with the microcomputer MC through terminals MC6, MC7, and MC8. Similarly to the motor M2, the stepping motor M3 is energized or deenergized according to the signal level at the terminal MC6. The rotational direction thereof is controlled by the signal levels at the terminals MC7 and MC8.

The interface IF4 is positioned between the microcomputer and an electronic flash device FL and connected with the microcomputer MC. The electronic flash FL is energized or deenergized through the terminal FC, the emission thereof is controlled through the terminal TRG, and the charge condition of a capacitor contained in the flashlight FL is detected through the terminal RDY.

The interface IF5 is illustrated between the microcomputer MC and a phototransistor PTR for receiving a signal from the remote controller 6. The interface IF5 applies a low level signal to the microcomputer MC through a terminal INREM when the phototransistor PTR receives a signal from the remote controller 6 under the remote control mode.

The interface IF6 is illustrated between the microcomputer MC and a timer display member LED2 composing the self-timer display section 2 shown in FIG. 1. The LED2 is turned on upon receipt of a low level signal through a terminal SELF and turned off upon receipt of a high level signal therethrough.

A circuit REMOTE of the remote controller 6 shown below the microcomputer MC is connected with a remote control release switch Srel, a sound generating switch Ssp, a release signal transmitting member LED1, a solar battery BA, and a small speaker SP. The remote controller 6 includes a secondary battery. Upon the pressing of the release button 7 shown in FIG. 1, the remote control release switch Srel is turned on and at the same time, the release signal transmitter LED1 emits a light. The speaker SP produces a short sound three times at an interval of one second immediately after the Srel is turned on. The solar battery BA generates electricity when it is irradiated and charges the secondary battery acting as the power source of the remote controller 6. When the remote controller 6 is mounted on the camera body, the input terminal INREL of the microcomputer MC is connected with the output terminal OUTREL of the remote controller 6. Normally, the level of the signal at the input terminal INREL is high, but becomes low when the remote control release switch Srel is turned on.

The sound generating switch Ssp is turned on when the sound generation setting setting member 27 is at the ON position while it is turned off when the sound generation setting setting member 27 is at the OFF position.

The photographing operation, of the camera having the remote controller, to be carried out in sequence is described based on flowcharts shown in FIGS. 5 through 8.

At the initial condition of step S001, a data input to any one of the ports is waited. If the level of a signal at any of the input ports changes in response to a photographer's pressing of any of the switches of the camera body, it is detected at step S002 whether the remote control switch Srem is ON or OFF. If the switch Srem is ON, i.e., if the remote controller 6 is mounted on the camera body, a remote control flag Frem is reset to "0" at step S003. Then, the program goes to step S004. If the remote control switch Srem is OFF, that is, if the remote controller 6 is removed from the camera body, the program jumps to step S011 at which the remote control flag Frem is set to "1". The remote control flag Frem detects whether or not the remote control mode is currently selected, thus carrying "1" in the remote control mode and "0" in the normal mode. At step S004, it is decided whether the photometric switch S1 is ON or OFF. If the photometric switch S1 is ON, the program goes to steps at which photometric and distance measuring operations are effected. If the photometric switch S1 is OFF, it is detected at step S005 whether the level of the signal at the input terminal INREL (hereinafter referred to as terminal INREL) of the microcomputer MC is high or low. As described previously, if the level of the signal at the terminal INREL is low in response to ON of the remote control release switch Srel, the release flag Frel is set to "1" at step S006. Thereafter, the program goes to steps at which photometric and distance measuring operations are effected. If the release flag Frel carries "1", regardless of whether the release switch S2 is ON or OFF, a shutter release operation is performed after a photometry and distance measuring for a focusing is completed. If the signal level at the terminal INREL is high at step S005, it is detected whether the self-timer switch Sslf is ON or OFF. If it is decided that the switch Sslf is ON, it is detected at step S008 whether or not the self-timer flag Fslf carries "0" or "1". The microcomputer MC stores whether the self-timer mode or the normal mode is selected according to the signal level of the self-timer flag Fslf. That is, if the self-timer flag Fslf carries "1", the microcomputer MC processes the photographing mode as the self-timer mode and if it carries "0", the microcomputer MC processes the photographing mode as the normal mode. If the flag Fslf carries "0" at step S008, it signifies that the switching button 15 is pressed under the normal mode. In this case, the program goes to step S009 at which the flag Fslf is set to "1" so as to change the photographing mode. If it is decided at step S008 that the flag Fslf carries "1", it signifies that the switching button 15 is pressed under the self-timer mode. In this case, the program goes to step S010 at which the flag Fslf is reset to "0" so as to cancel the self-timer mode. After the photographing modes are switched as described above or if it is decided at step S007 that the self-timer switch Sslf is OFF, the program goes to step S001 at which a signal input to any of the input ports is waited.

As described previously, when it is decided at step S002 that the remote controller 6 is removed from the camera body and consequently, if it is decided at step S011 that the remote control flag carries "1", i.e., if the photographing mode is set to the remote control mode, the program goes to step S012 at which the self-timer flag Fslf is reset to "0" because when a shutter release operation is performed by the remote controller 6, it is unnecessary to set the photographing mode to the self-timer mode. Then, it is detected at step S013 whether the photometric switch S1 is ON or OFF. If the photometric switch S1 is ON, the remote control flag Frem is reset to "0" at step S018. Thereafter, the program goes to steps at which photometric and distance measuring operations are effected. The pressing of the release button 1 signifies the decision that the remote control mode is not appropriate although the remote controller 6 is removed from the camera body. If the photometric switch S1 is OFF, it is detected at step S014 whether the signal level at the terminal INREM is low or high. If its signal level is low, that is, if the phototransistor PTR receives a signal from the remote controller 6, the release flag Frel is set to "1" at step S015. Then, the program goes to steps at which photometric and distance measuring operations are effected. If the signal level at the terminal INREM is high, it is detected at step S016 whether the AF lock switch Safl is ON or OFF. If it is ON, the AF lock flag Fafl is set to "1" at step S017. Thereafter, the program goes to steps at which photometric and distance measuring operations are carried out. If the AF lock flag Fafl carries "1", the microcomputer MC stores that an AF lock is performed and holds the data of a measured distance until a shutter release operation is performed. If it is decided at step S016 that the AF lock switch Safl is OFF, the program returns to step S001 at which an input of a signal to any of the ports is waited.

Figure 6:
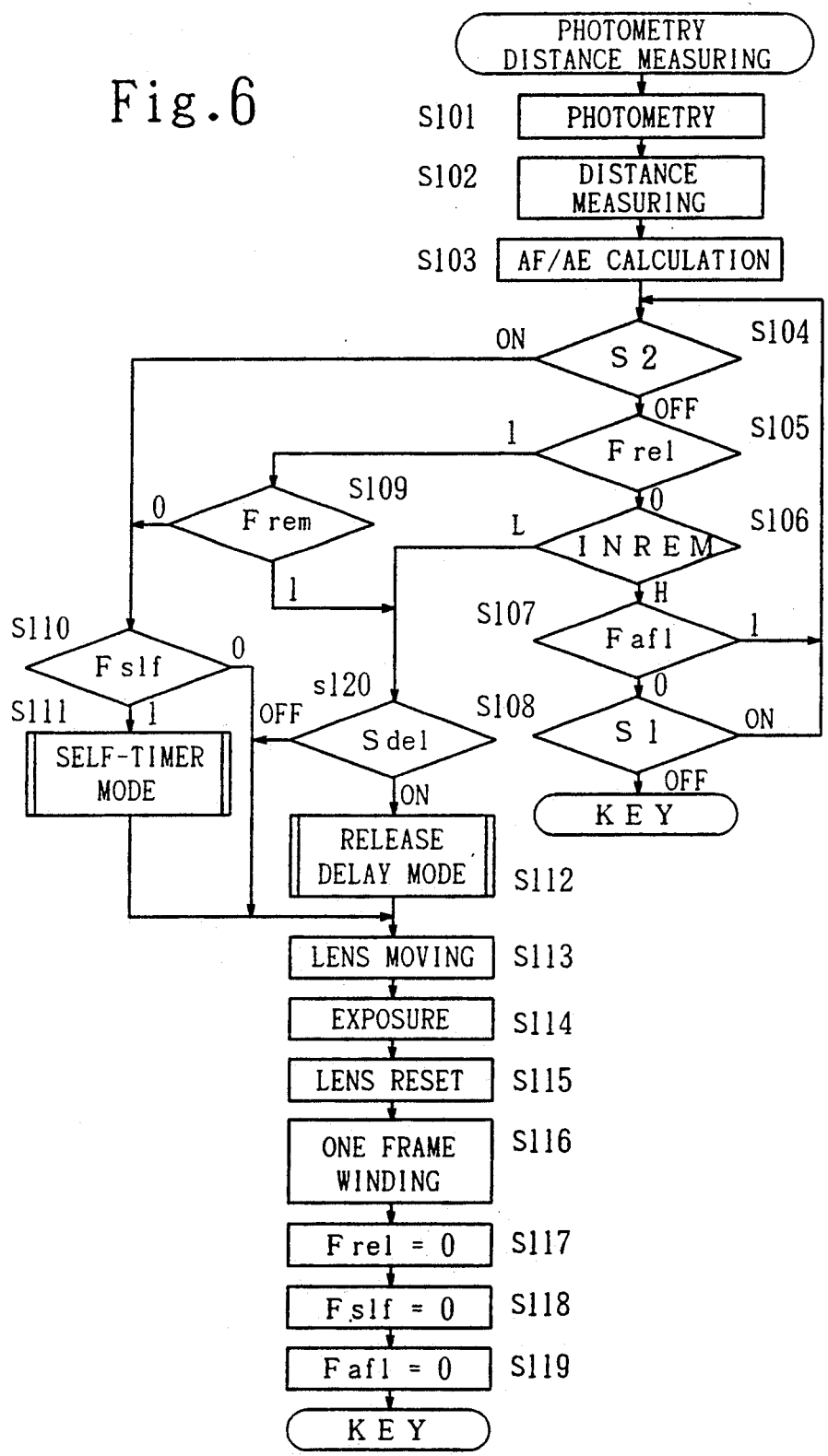

Next, photometric and distance measuring operations are described referring to the flowchart shown in FIG. 6.

Figure 7:
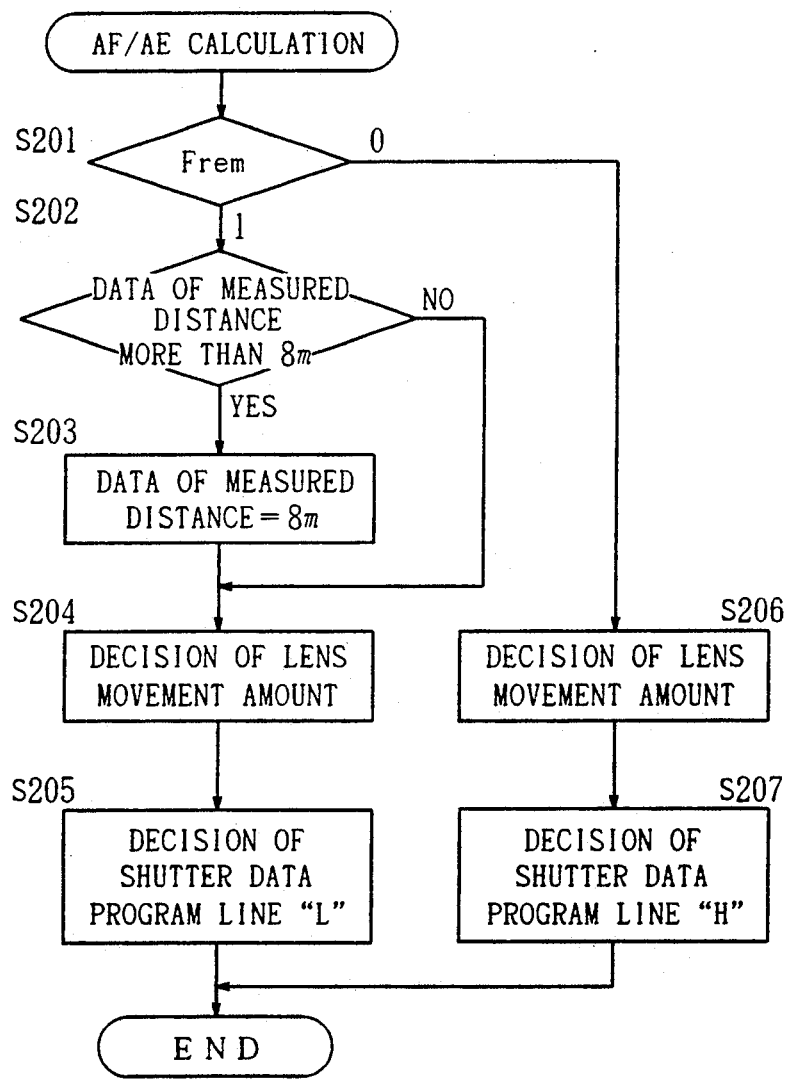

First, at steps S101 and S102, the IC shown by the AFE of FIG. 4 performs photometric and distance measurements and the data obtained is stored by the memory of the microcomputer MC. At step S103, an AF and AE calculations which will be described later with reference to FIG. 7 are performed. A lens moving amount, an aperture value, and a shutter speed are determined according to the AF and AE calculations. Thereafter, it is detected at step S104 whether the release switch S2 is ON or OFF. If it is ON, the program goes to step S110. If the switch S2 is OFF, the program goes to step S105 at which it is detected whether the release flag Frel carries "0" or "1". If the flag Frel carries "0", it is detected at step S106 whether the signal level at the terminal INREM is low or high. If the signal level is low, that is, the phototransistor PTR receives a signal from the remote controller 6, it is detected at step S120 whether the delay switch Sdel is ON or OFF. If it is decided that the delay switch Sdel is ON, the program goes to steps of RELEASE DELAY subsequent to step S112. If it is decided that at step S120 that the delay switch Sdel is OFF, the program skips step S112, thus going to step S113 so as to perform a photographing operation. If it is decided at step S105 that the Frel carries "1", the program goes to step S109 at which it is detected whether the remote control flag Frem carries "0" or "1". If the Frem carries "0", the program goes to step S110 and if it carries "1", the program goes to step S120. If it is decided at step S106 that the signal level at the terminal INREM is high, that is, if a signal is not received from the remote controller 6, it is detected at step S107 whether the AF lock flag Fafl carries "0" or "1". If it carries "1", i.e., if an AF lock is carried out, the program returns to step S104. If it carries "0", i.e., if it is decided at step S107 that an AF lock is not carried out, the program goes to step S108. At step S108, it is detected whether the photometric switch S1 is ON or OFF. If it is ON, the program returns to step S104. If it is OFF, the program jumps to the initial condition KEY shown in FIG. 5. That is, when shutter release under release delay operation is effected by the remote controller 6, the program goes to step S112 of RELEASE DELAY MODE and the subsequent steps at which photographing operations are carried out. When a shutter release operation is performed under the normal mode, the program goes from step S104 to step S110. As steps S107 and S108 show, when the AF lock flag Fafl carries "1" at a result of the pressing of the AF lock button, the program does not return to KEY even if the photometric switch S1 is OFF. Thus, obtained data of distance measurement for focusing is stored by the memory of the microcomputer MC until a shutter release operation is made.

At step S110, it is detected whether the self-timer flag Fslf carries "0" or "1" so as to detect whether the self-timer mode or the normal mode is selected. If the self-timer mode is selected, i.e., if the self-timer flag Fslf carries "1", the program goes to step S111 of SELF-TIMER MODE, then goes to step S113 and steps subsequent thereto so that photographing operations are performed. If the self-timer flag Fslf carries "0", the program skips step S111 and goes to step S113 and steps subsequent thereto so that photographing operations are performed.

At step S113, according to the result of the AF and AE calculations, the lens moves to an appropriate position along the optical axis thereof so as to obtain an in-focus condition. At step S114, a proper camera exposure is performed according to the result of the AF and AE calculations. At step S115, the lens is positioned at the initial condition. At step S116, one frame of the film is wound. Thereafter, the release flag Frel, the self-timer flag Fslf, and the AF lock flag Fafl are reset to "0" at steps S117, S118, and S119, respectively. Then, the program returns to the initial condition, namely, KEY at which a signal input to any of the input ports is waited.

Next, the AF and AE calculations are described with reference to the flowchart shown in FIG. 7.

First, it is detected at step S201 whether the remote control flag Frem carries "0" or "1". If it carries "1", that is, if it is decided that the remote control mode is selected, data of the measured object distance is checked at step S202. If the object distance is more than 8 m, the data is forcibly set to 8 m at step S203. If the data is 8 m or less, the program goes from step S202 to step S204. At step S204, a lens moving amount for obtaining a in-focus condition is calculated based on the data of the measured object distance, and the data of the calculated lens moving amount is stored by the memory of the microcomputer MC. At step S205, a shutter speed and an aperture value are determined based on the measured data of photometry.

If it is decided at step S201 that the remote control flag Frem carries "0", i.e., if the normal mode is selected, a lens moving amount is determined at step S206, and a shutter speed and an aperture value are determined at step S207. The shutter speed and the aperture value in the remote control mode are determined at step S205 based on the program line H shown in FIG. 9, and the shutter speed and the aperture value in the normal mode are determined based on the program line L shown in FIG. 9. The aperture value (F) in the remote control mode is set to a predetermined number larger than that in the normal mode so that the depth of field in the remote control mode becomes greater than that in the normal mode under the same light condition. The shutter speed in the remote control mode automatically becomes lower than that in the normal mode under the same light condition, in accordance with the increase of the aperture value.

Figure 8:
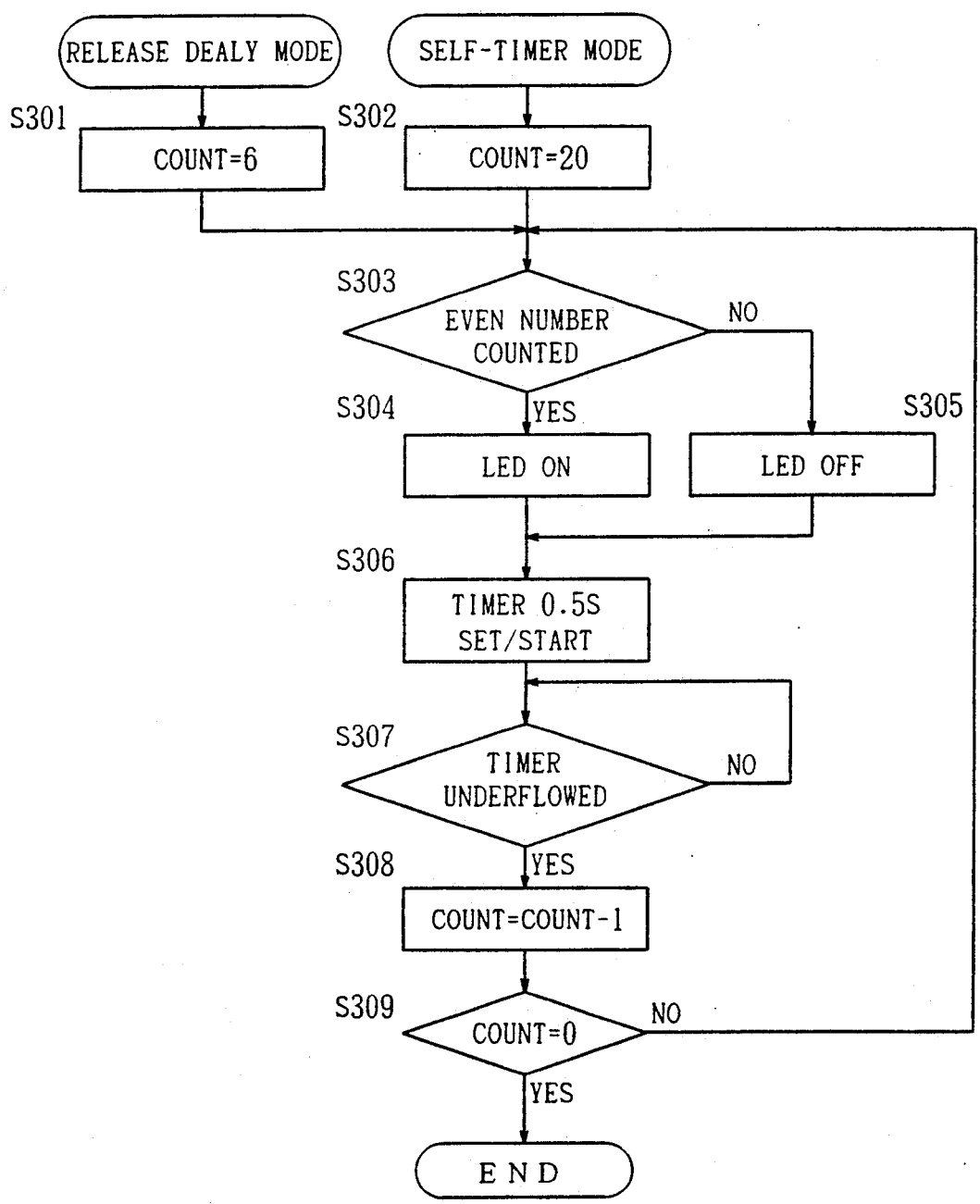

The SELF-TIMER MODE of step S111 and the RELEASE DELAY MODE of step S112 shown in FIG. 6 are described with reference to the flowchart shown in FIG. 8.

When the self-timer mode is selected, at step S302, a numerical value of 20 is set in the memory COUNT of the microcomputer MC. Then, it is detected at step S303 whether the numerical value set in COUNT is an even or odd number. If the numerical value is an even number, the self-timer display LED is turned on at step S304. If the numerical value is an odd number, the self-timer display LED is turned off at step S305. Then, at step S306, t=0.5 seconds is set in a timer included the microcomputer MC and the timer starts counting time. It is detected at step S307 whether or not the timer underflows. When the timer underflows, a value of COUNT−1 is set in COUNT at step S308. It is detected at step S309 whether or not the numerical value of COUNT is "0". If it carries "0", the program goes to step S113. If the value of COUNT is other than "0", the above operation is repeated until the numerical value of COUNT becomes "0". Accordingly, during the self-timer mode, the self-timer display LED emits lights for 10 seconds at an interval of one second. Then, the shutter is released.

In the RELEASE DELAY MODE, a numerical value of "6" is set in the memory COUNT at step S301. Thereafter, an operation identical to the self-timer photographing operation is performed. After the self-timer display LED emits lights for three seconds at an interval of one second, the shutter is released. As described previously, although not shown in the flowchart, when the sound generating switch Ssp is ON, the speaker provided in the remote controller 6 generates a sound three times at an interval of one second in synchronization with the flash of the LED when the release delay operation is carried out.

Figure 9:
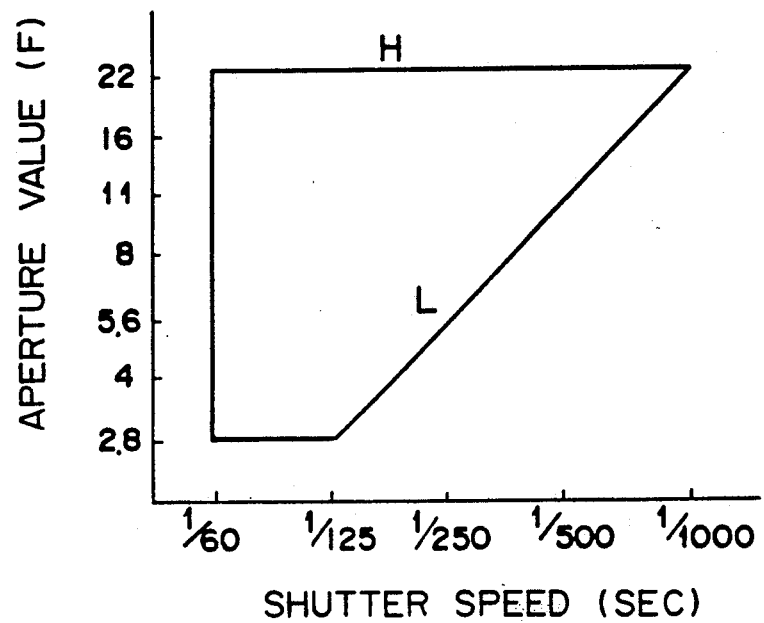
FIG. 9 is a graph showing the relationship between an aperture value and a shutter speed in both a normal and a remote control photographing modes.
Figure 10:
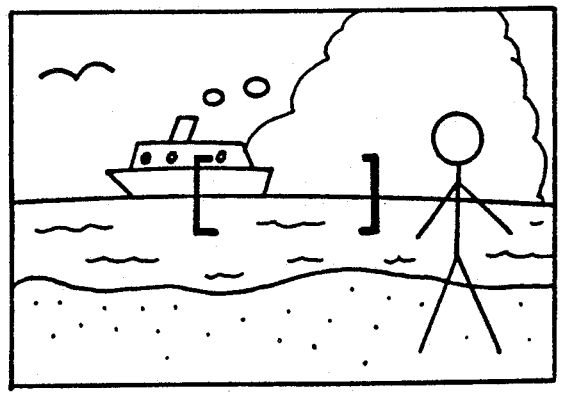
FIG. 10 is a schematic view showing an example of an image in a viewfinder.

As described above, since the remote controller 6 covers the object distance fixing switch, the release delay setting switch, and the remote controller detecting switch, a photographer does not make a mistake of operating these switches. Further, since the object distance is set to 8 m in the remote control mode, the main object can be photographed in focus even though it is found that the object in the viewfinder is out of a focus area and the background, for example, infinity is in the focus area. If, in addition to the above setting operation, an aperture value and a shutter speed in the remote control mode are determined on the basis of the program line H as shown in FIG. 9, the accuracy of in-focus condition can be increased. The above efficiency, i.e. the accuracy of the in-focus condition, can be further increased by reducing the diaphragm opening utilizing the electronic flash device. Further, when the shutter release operation is carried out by the remote controller 6, the timing of a shutter release delay is indicated by a sound and a flashlight so that the photographer can predict precisely the shutter release timing. Furthermore, since the camera is provided with the solar battery, it is unnecessary to replenish or replace a battery and in addition, the solar battery is not damaged because it is accommodated in the camera body not to be exposed outside when the remote controller is not used.

The camera according to the embodiment eliminates the need for taking a cramped posture when a shutter release operation is performed. More specifically, known cameras as well as the camera according to the present invention is provided with a light emitting portion of an electronic flash device positioned on the side opposite to the gripping portion, i.e., it is disposed on the upper right of the camera body when the camera body is seen opposite thereto. When a release button is pressed with the camera body lengthwise, it is necessary for the photographer to have the camera body with the gripping side downward in order to avoid careless interruption by the photographer's hand to the flash device. In this case, it is very difficult to take a photograph properly because the right hand is cramped. According to the camera of the embodiment, the release button to be used in the remote control mode positioned on the side opposite to the release button to be used in the normal mode may also be pressed in the normal photographing mode. That is, both hands can be used to press the release buttons without the photographer taking a cramped posture.

In the above embodiment, a predetermined maximum object distance, for example 8 m, is set to the memory of the microcomputer MC. According to the present invention, the following modification is available. That is, it may be so designed that the real measured object distance signal is constantly allowed to be outputted from the light projecting-receiving section 3 and there is provided a photographing lens moving mechanism having a predetermined range of lens movement such that the lens movement is stopped at one limit end of the above range by a limiter included therein even if an object distance signal representing an object distance larger than the predetermined maximum object distance is outputted.

Further, in the above respective embodiments there is used a distance measuring system for the automatic focusing mechanism. According to the present invention, there may be used a in-focus condition detecting system for the automatic focusing mechanism in which a defocus amount is detected to obtain the in-focus condition. In this case, similarly to the above modification, a limiter may be mounted in the lens moving mechanism to stop the lens movement at one limit end of a predetermined range of lens movement. And alternatively, there may be provided means for detecting a distance from the camera on which the in-focus condition is obtained.

Although the present invention has been fully described in connection with the preferred embodiments thereof with reference to the accompanying drawings, it is to be noted that various changes and modifications are apparent to those skilled in the art. Such changes and modification are to be understood as included within the scope of the present invention as defined by the appended claims unless they depart therefrom.

What is claimed is:

1. A camera capable of performing an auto-focusing operation in response to a signal from a remote controller which is provided separately from said camera, comprising:
   means for receiving the signal from the remote controller;
   means, responsive to the signal received by said receiving means, for measuring an object distance of an object aligned with a focus area which is positioned with a predetermined region of a field of view in a viewfinder;
   memory means for storing a predetermined object distance;
   means for comparing the object distance measured by said measuring means and the predetermined object distance stored by said memory means with each other; and
   means for replacing the measured object distance by the predetermined object distance when the measured object distance exceeds the predetermined object distance.

2. A camera capable of performing an auto-focusing operation on an object aligned with a focus area which is positioned within a predetermined region of a field of view in a viewfinder in response to a signal from a remote controller which is provided separately from said camera, comprising:
   means for receiving the signal from the remote controller; and
   means for selectively setting one of a first aperture size and a second aperture size which is smaller than the first aperture size under a predetermined amount of light, wherein said setting means sets the second aperture size in response to the signal received by said receiving means.

3. A camera capable of performing a shutter release operation in response to a signal from a remote controller which is provided separately from said camera, comprising:
   means for receiving the signal from the remote controller;
   means, responsive to the signal received by said receiving means, for setting a time for delaying an exposure timing after an operation designating the shutter release operation of said camera is performed by the remote controller; and
   sound generating means, provided in the remote controller, for indicating the exposure timing delayed according to the delay time set by said setting means.

4. A camera capable of performing a shutter release operation in response to a signal from a remote controller which is provided separately from said camera, comprising:
   means for receiving the signal from the remote controller;
   memory means for storing a predetermined object distance;
   a focusing lens which consists of at least a part of a photographing lens;
   means for moving said focusing lens within a predetermined range; and
   means, responsive to the signal received by said receiving means, for controlling said moving means not to move said focusing lens to a position corresponding to an object distance which exceeds the predetermined object distance within the predetermined range.

5. A camera according to claim 1 wherein the predetermined object distance is a maximum distance at which the signal from the remote controller can reach said receiving means of said camera.

6. A camera capable of performing an auto-focusing operation in response to a signal from a remote controller which is provided separately from said camera, comprising:
   means for receiving the signal from the remote controller;
   means, responsive to the signal received by said receiving means, for measuring an object distance of an object aligned with a focus area which is positioned within a predetermined region of a field of view in a viewfinder;
   memory means for storing a predetermined object distance;

means for comparing the object distance measured by said measuring means and the predetermined object distance stored by said memory means with each other; and means for replacing the measured object distance by a specified object distance when the measured object distance exceeds the predetermined object distance.

7. A camera according to claim 6 wherein the predetermined object distance is a maximum distance at which the signal from the remote controller can reach said receiving means of said camera.

8. A camera capable of performing a shutter release operation in response to a signal from a remote controller which is provided separately from said camera, comprising:

means for receiving the signal from the remote controller;

a focusing lens which consists of at least a part of a photographing lens;

means for moving said focusing lens within a predetermined range; and means, responsive to the signal received by said receiving means, for controlling said moving means so as to limit a movable range of said focusing lens within the predetermined range.

9. A camera according to claim 8 wherein said controlling means controls said moving means to move said focusing lens to a position corresponding to a maximum object distance within the limited movable range in response to the signal from the remote controller.

10. A camera capable of performing a shutter release operation in response to a signal from a remote controller which is provided separately from said camera, comprising:

means for receiving the signal from the remote controller;

a focusing lens which consists of at least a part of a photographing lens;

means for moving said focusing lens within a predetermined range; and means, responsive to the signal received by said receiving means, for controlling said moving means to move said focusing lens toward a position in a limited range within the predetermined range.

11. A camera according to claim 10 wherein said controlling means controls said moving means to move said focusing lens to a position corresponding to a maximum object distance within the limited movable range in response to the signal from the remote controller.

12. A camera operable in a remote control photographing mode comprising:

a camera body;

a remote controller for operating said camera in the remote control photographing mode;

a manually operable member provided on said camera body for being operated when said camera is in the remote control photographing mode; and means for removably mounting said remote controller on said camera body, said mounting means including means for covering said manually operable member by said remote controller for preventing access to said manually operable member when said remote controller is mounted on said camera body.

13. A camera according to claim 12 wherein said manually operable member comprises a switch.

* * * * *

UNITED STATES PATENT AND TRADEMARK OFFICE
CERTIFICATE OF CORRECTION

PATENT NO. : 5,119,123
DATED : June 2, 1992
INVENTOR(S) : Shinji Tominaga, et al.

It is certified that error appears in the above-identified patent and that said Letters Patent is hereby corrected as shown below:

In Col. 8, lines 9 and 10, after "microcomputer", insert --MC--.

In Col. 8, line 52, delete "setting" (first occurrence).

In Col. 8, line 54, delete "setting" (first occurrence).

In Col. 14, line 7 (Claim 2, line 3), change "afield" to --a field--.

Signed and Sealed this

Third Day of August, 1993

Attest:

MICHAEL K. KIRK

Attesting Officer

Acting Commissioner of Patents and Trademarks